Aug. 25, 1964  W. E. BRINDLEY  3,145,572
ROTATION SENSOR

Filed Nov. 24, 1958  4 Sheets-Sheet 1

WILLIAM E. BRINDLEY
INVENTOR

BY
ATTORNEYS

Aug. 25, 1964  W. E. BRINDLEY  3,145,572
ROTATION SENSOR

Filed Nov. 24, 1958  4 Sheets-Sheet 2

WILLIAM E. BRINDLEY
INVENTOR.

BY Alden D. Redfield
Warren Hunt
ATTORNEYS

Aug. 25, 1964  W. E. BRINDLEY  3,145,572
ROTATION SENSOR

Filed Nov. 24, 1958  4 Sheets—Sheet 3

WILLIAM E. BRINDLEY
*INVENTOR.*

BY
ATTORNEYS

Aug. 25, 1964

W. E. BRINDLEY 3,145,572

ROTATION SENSOR

Filed Nov. 24, 1958

WILLIAM E. BRINDLEY
INVENTOR.

BY
ATTORNEYS

United States Patent Office 3,145,572
Patented Aug. 25, 1964

3,145,572
ROTATION SENSOR
William E. Brindley, Reading, Mass., assignor to Avco Manufacturing Corporation, Cincinnati, Ohio, a corporation of Delaware
Filed Nov. 24, 1958, Ser. No. 776,136
10 Claims. (Cl. 73—505)

The present invention relates to the field of instrumentation and more particularly to that portion of the field which concerns sensors such as may be used for detecting rotation of a body.

Instruments made in accordance with the present invention preferably employ ultrasonic phenomena for producing standing acoustic waves which, upon rotation, yield Coriolis forces proportional to the rate of rotation. The Coriolis forces, being normal to the direction of the standing waves, may be readily detected as an indication and measure of rotation.

Generally, these novel instruments include a medium in which a standing acoustic wave is established. In the preferred embodiment of the invention, the medium comprises a liquid in intimate association with a pair of concentric cylindrical piezoelectric transducers which are electronically driven to establish radial standing waves within the medium. Submerged within the medium is a third transducer which serves as a detector. This detector transducer is oriented radially and generates an electrical signal proportional to its flexural deflection caused by Coriolis forces acting at 90° to the standing waves.

A modified version of the invention may utilize only one transducer and an opposed reflector for establishing the standing wave within the medium.

Useful in many fields where rotation must be measured, this novel sensor is characterized by simplicity and absence of moving parts. It may eventually replace gyroscopic elements in many applications where rate gyros are presently employed, as in guidance systems for missiles.

In view of the foregoing it will be apparent that it is a broad object of the invention to provide an improved means for detecting rotation of a body.

Another broad object of the invention is to provide an ultrasonic instrument employing Coriolis forces for detecting the rate of rotation to which the instrument is subjected.

Another object of the invention is to provide a sensor employing at least one cylindrical driving transducer to establish a uniform radial pattern of standing waves which, upon rotation, yield circumferentially acting Coriolis forces.

A further object of the invention is to provide a sensor in which a radial pattern of standing waves may be established without energy loss by dispersion of energy reflected by reflecting surfaces of the sensor.

The novel features that are considered characteristic of my invention are set forth in the appended claims; the invention itself, however, both as to its organization and method of operation, together with additional objects and advantages thereof, will best be understood from the following description of specific embodiments when read in conjunction with the accompanying drawings, in which:

*General Principles*

Figure 1:
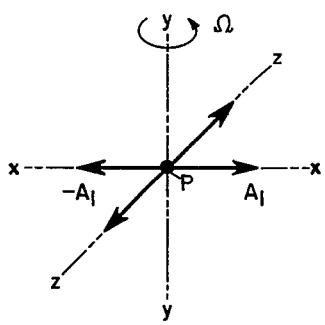
FIGURE 1 is a diagrammatic representation of the effect of rotation on a particle executing harmonic motion.
Figure 2:
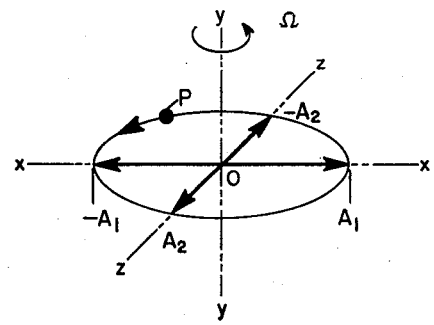
FIGURE 2 is a diagrammatic representation of the moving particle describing a curved path under the influence of harmonic and Coriolis forces.
Figure 3:
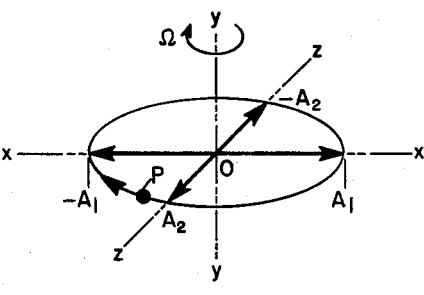
FIGURE 3 is a diagram of particle movement similar to FIGURE 2 but opposite in direction.

Principles underlying this invention will be understood by reference to FIGURES 1-3. Referring first to FIGURE 1, a particle $p$ having mass is shown executing simple harmonic motion along the horizontal axis $x$—$x$. If the path of such a particle is rotated about an axis $y$—$y$ normal to its line of oscillation, it will begin to oscillate at the same frequency at right angles to the original oscillation along the axis $z$—$z$, which throughout this discussion is assumed to remain mutually perpendicular to $x$—$x$ and $y$—$y$ as rotation occurs. The amplitude of the second oscillation will be proportional to the amplitude of the first oscillation, to the rate of rotation $\Omega$ and inversely to the frequency of oscillation of the harmonic motion $\omega$. Thus, in FIGURE 1, $A_1$ may be taken to represent the maximum amplitude of the particle along the $x$—$x$ axis, the amplitude $x$ at any time $t$ being $x = A_1 \sin \omega t$. As will be discussed more fully hereinafter, the amplitude of oscillation along the $z$—$z$ axis will therefore be proportional to $A_1$, $\Omega$ and $$\frac{1}{\omega}$$

It remains to be pointed out that the direction of rotation of the system about the $y$—$y$ axis determines the phase relationship between the harmonic oscillations along the $x$—$x$ and $z$—$z$ axes. This will be better understood with reference to FIGURES 2 and 3.

In FIGURE 2, the particle is assumed to be initially oscillating harmonically along the $x$—$x$ axis, describing a path between the extreme amplitudes $-A_1$ and $+A_1$. If the $x$—$x$ axis is now rotated about axis $y$—$y$, counterclockwise as viewed from above, the particle is displaced in the $z$—$z$ direction. The sense of this displacement, relative to that in the $x$—$x$ direction, is directly related to the direction of rotation of the system. Thus, as the particle moves from the extreme position $A_1$, to the opposite extreme $-A_1$, the displacement of the particle in the $z$—$z$ direction increases from zero to $-A_2$ and then back to zero. As the particle moves from $-A_1$ to $A_1$, the particle is displaced in the $z$—$z$ direction from zero to $A_2$ and then back to zero. In other words, while the entire system is being rotated about $y$—$y$, the particle describes an elliptical orbit having a semimajor axis of $A_1$ and a semiminor axis of $A_2$. As a special case, when $A_1 = A_2$, the orbit is circular.

The direction of movement of the particle in the elliptical orbit is reversed if the direction of rotation of the system is reversed. This is illustrated by FIGURE 3 in which the system is shown rotated clockwise about the $y$—$y$ axis as viewed from above. With such rotation, the particle is displaced in the $z$—$z$ direction from zero to $A_2$ and back to zero as the displacement in the $x$—$x$ direction varies from $A_1$ to $-A_1$. Thus, a 180° shift is effected in the phase of the particle displacement with respect to the x—x and z—z axes by reversal in direction of rotation of the system. The reason for the phenomenon will become more apparent when the nature of Coriolis forces is considered in greater detail later in the application.

It is sufficient at this point to understand that rotation of the system produces particle displacement in a direction 90° from the direction of the original harmonic oscillation and that the phase is related to the direction of rotation of the system.

Coriolis Forces

Coriolis forces are present when the path along which a particle is moving is subjected to rotation. Thus, if a particle moves on a path as the path rotates, the acceleration of the particle is the vector sum of (1) the acceleration that the particle would have if the path were fixed and the particle moved along the path with velocity $v$, (2) the acceleration that the particle would have if it were fixed on the path and the path rotated with angular velocity $\Omega$, and (3) $2v\Omega$, called the "component supplementary acceleration." It is this latter quantity which in common parlance is termed the "Cariolis acceleration." It is directed perpendicular to $v$ with a sense such that if it were applied as a force at the end of the vector $v$, it would cause the vector $v$ to turn in its actual direction of rotation.

Returning to FIGURES 1-3, it will now be understood that the Coriolis acceleration itself is directly dependent upon, not only the velocity of the particle along the x—x axis, but also the rate of angular rotation of the system $\Omega$. The velocity $v$ of the harmonic oscillation in turn is proportional to the first derivative of the harmonic expression $A_1 \sin \omega t$.

Thus, if the displacement in the x—x direction is expressed $x = A_1 \sin \omega t$, the velocity in the x—x direction will be:

$$\frac{dx}{dt} = v = A_1 \omega \cos \omega t$$

Assuming that counterclockwise rotation of the system is considered positive, the Coriolis acceleration is equal to:

$$2v\Omega = 2A_1 \Omega \omega \cos \omega t$$

and if clockwise rotation of the system is deemed negative, then the Coriolis acceleration becomes $$-2A_1 \Omega \omega \cos \omega t$$

The Coriolis acceleration therefore changes from positive to negative if the direction of the rotation of the system is reversed, despite the fact that the harmonic velocity $v$ does not change sign. This bears out the foregoing statements that a phase shift is introduced between the Coriolis acceleration and the harmonic velocity as the rotation of the system is reversed and, in fact, it will be noted from the foregoing equations that the phase shift is equal to 180°.

The sensors disclosed in this application are designed to detect the forces resulting from the Coriolis acceleration and further, by detecting the phase relationship of the Coriolis acceleration relative to the harmonic velocity, an indication of the direction, as well as magnitude, of rotation of the system may be obtained.

It will be apparent to those skilled in the art that a rotation rate sensor will also serve as a displacement sensor since displacement is merely the time integral of rate. Similarly, with certain restrictions, a rate sensor may also be employed as an acceleration sensor since acceleration is merely the time differential of rate. Since the use of the device as a displacement or acceleration sensor is mainly a function of the system use of the device and not the device itself, elaboration of these particulars is not necessary.

A more complete discussion of Coriolis accelerations will be found in most textbooks on mechanics. One such text having an excellent discussion of the effect, is "Analytical Mechanics for Engineers," by F. B. Seely and N. E. Ensign, Second Edition, published by John Wiley & Sons, Inc.

Acoustic Wave Phenomena

To this point in our discussion we have predicated Coriolis accelerations on the motion of a discrete particle having mass. The same principles may be applied to a fluid or solid medium, which may be regarded as a collection of particles. By establishing an acoustic wave in the medium, as by application of energy at ultrasonic frequency, the particles may be set in motion and when rotated, will generate Coriolis forces. A simple explanation of such techniques will be understood with reference to FIGURES 4 and 5.

Figure 4:
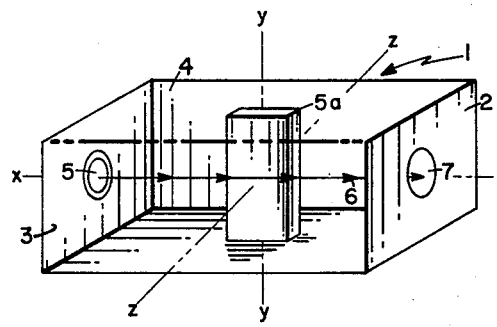
FIGURE 4 is a simplified perspective view of a rectangular sensor.

FIGURE 4 shows diagrammatically a rectangular housing, generally designated 1, having parallel end walls 2 and 3. Within the housing is a liquid 4 to which energy is delivered by a driving transducer 5. The transducer may take the form of a piezoelectric crystal which is electrically excited. As is well known, such crystals are capable of efficiently converting electrical energy into mechanical vibrations when excited at their natural frequency. If such a vibrating transducer is immersed in a liquid, it will cause a plane acoustic wave to travel through the liquid, as indicated by the plurality of arrows 6.

If a single driving transducer were immersed in an infinite medium, a plane acoustic wave could be set up in the medium and it could be used to establish Coriolis forces for measuring rotation. This, however, is a theoretical proposition, and in practice, it is not desirable to build a sensor having effectively an infinite medium. Since the medium must necessarily be bounded, as by housing 1, it is desirable to provide either a reflecting surface or another driving transducer 7 opposite transducer 5. Both can be used to establish a standing acoustic wave within the sensor, and the energy stored in the standing wave can be made very large compared with the rate at which energy is imparted to the system by the transducer 5.

Two harmonic waves travelling in opposite directions will establish a standing wave in a stationary medium if these waves have the same frequency, have the same velocity of propagation within the medium, and are properly phased to reinforce each other. These conditions can be met in a sensor, such as shown in FIGURE 4, since the velocity of propagation is a function of the medium common to both driven waves (or the driven and reflected waves, as the case may be), and because no change of frequency is effected by the reflector or by the second driving transducer, positioned at 7. Proper phasing can be attained by establishing the proper distance between the driving transducers, or the driving transducer and reflector, or alternatively by choosing an appropriate frequency.

The rectangular sensor is described in this application for purposes of illustration only. Such sensors are more particularly set forth and claimed in pending application Serial No. 770,507, entitled "Means for and Method of Detecting Rotation" filed by Thomas G. Hart on October 29, 1958.

Figure 5:
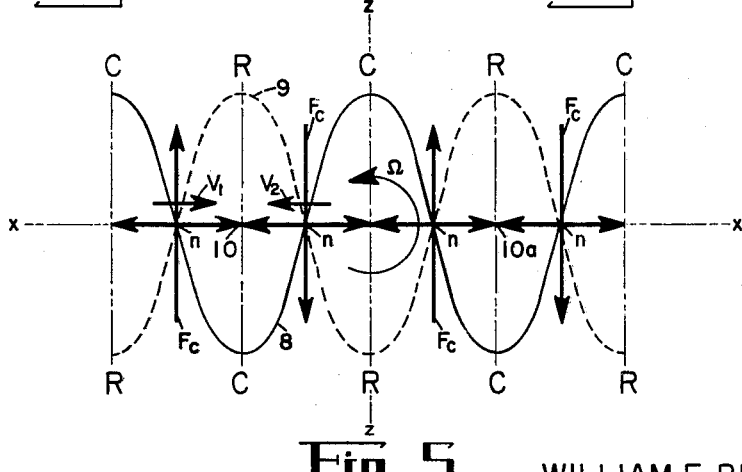
FIGURE 5 is a diagrammatic representation of a standing acoustic wave and associated Coriolis forces acting normal to the wave.

FIGURE 5 will promote an understanding of standing waves. The figure has been drawn in the plane of x—x, z—z axes, with the y—y axis perpendicular to the plane of the paper at the intersection of the other axes. It will be assumed that a pair of transducers are positioned at the opposite ends of the x—x axis and are synchronized in their vibrations and are suitably spaced from each other to promote harmonic particle movement along the x—x axis. With the foregoing conditions met, the particles will move with simple harmonic motion along the x—x axis creating alternate regions of compression and rarefaction. Thus, in FIGURE 5, curve 8 represents the pressure variations along the x—x axis at one extremity of particle movement, comprising alternate regions of compression and rarefaction indicated by the letters C and R along the top of the figure. At the opposite extremity of particle movement, a different distribution of compression and rarefaction is established as indicated by the dash line curve 9 and by the letters C and R at the bottom of the figure.

It will be noted that the regions of compression and rarefaction occur at regular intervals, the distance between successive regions of compression, or of rarefaction, being one wave length of the standing wave.

A standing wave results from the resonance of the driving transducers and of the wave propagating in the medium, and from the spacing of the driving transducers, or the driving transducer and its reflector, so that wave reinforcement occurs.

Another characteristic of a standing wave is the existence of pressure nodes—stationary points where no compression or rarefaction occurs. These points, designated $n$ in FIGURE 5, are midway between the points of alternating maximum compression and rarefaction, indicated by letters C and R, which are known as pressure "antinodes."

Between antinodes of the standing wave, the particles execute harmonic motion. Thus, each particle reaches an extreme position, and passes through a median position in time phase with every other particle. This necessarily implies that periodically all moving particles are stationary simultaneously.

Concentrating now on curve 8, and assuming at the beginning of our discussion that particles have been concentrated at the regions of compression, it will be noted that subsequent particle movement will be directed towards points 10 and 10a where the next successive compression will be formed, as indicated by curve 9. During such particle movement maximum velocities will be attained at the pressure nodes, as indicated by vectors $v_1$ and $v_2$ in the figure.

Assuming now angular rotation $\Omega$ of the entire system and particles having instantaneous velocities $v_1$ and $v_2$, rotation $\Omega$ will generate Coriolis accelerations and produce forces $F_c$ acting on the particles. It will be noted that adjacent vectors are oppositely directed. This results from the difference in sense of the velocities $v_1$ and $v_2$.

Considering the system as a whole, a Coriolis force vector is associated with every particle. The distribution of forces along the $x$—$x$ axis varies sinusoidally because of the harmonic variation of particle velocity along the axis. A planar transducer positioned parallel to the $x$—$x$ axis (such as shown at 5a in FIGURE 4) would be subjected to these sinusoidal forces and be deflected into a flexural wave.

As mentioned earlier, the Coriolis forces are dependent only upon particle velocity and rate of rotation of the system. In other words, the Coriolis forces normal to the standing wave are uniform throughout the length of the wave for particles having the same velocity, although they have a sense dependent upon the sense of the velocity as illustrated by vectors $F_c$.

The foregoing principles apply with equal vigor to sensors having a driving transducer and a reflector, instead of a pair of driving transducers. Should a phase change be introduced upon reflection of the acoustic wave, wave reinforcement may still be assured by proper spacing between the driving transducer and reflector.

*Energy Considerations and Impedance*

To this point in our discussion we have spoken of particle velocity without consideration for the energy that must be imparted to the medium to establish the standing wave.

As has been pointed out, an acoustic wave is a periodic disturbance of alternating compression and rarefaction propagating in a medium at a given velocity. Thus the acoustic wave is a mechanism whereby energy is transferred from one place to another in a medium. Just as characteristics of electromagnetic waves change throughout the frequency spectrum, properties of acoustic waves vary with frequency. The study and application of higher frequency waves, such as employed by the present invention, comprise the field of ultrasonics.

Impedance is a notion useful in summarizing the condition under which energy is transferred. In an effort to set up a simple approximation of energy transfer within a boundaryless medium, we can make the assumption that there is no energy attenuation within the medium itself. Such an assumption is almost valid for a medium, such as the fluid within a sensor. Energy transfer to the fluid is a second factor to be considered. The effectiveness of the driving transducer in transferring energy to the medium depends upon its acoustic impedance relative to that of the medium. Similarly, the percentage of energy reflected by the reflecting surface is also a function of the acoustic impedance of the reflecting surface and medium.

The concept of impedance is dependent to a large measure on the configuration of the energy in one medium relative to a second medium to which the energy is to be transferred. To illustrate, the amount of kinetic energy that a body possesses is a measure of the amount of work it is capable of doing by virtue of its mass and movement. A given body usually possesses simultaneously potential energy as well as kinetic energy, the potential energy representing a measure of the amount of work that the body can do by virtue of its mass and position. If the body is to do work, for instance on another body, the energy it possesses has to be transferred to the other body. Its ability to transfer energy to the other body depends upon the form of its energy, that is, for kinetic energy, mass and velocity, and for potential energy, mass and position, in relation to the form that the energy will take in the other body. For example, a body with a certain mass and a certain velocity is able to transfer its kinetic energy completely to another body by simple elastic impact only if the other body has identical mass.

Another factor of equal significance in determining the efficiency of energy transfer is the time relationship between the components of the energy brought about by time variation in the division of total energy between potential energy and kinetic energy.

Summarizing the two concepts, it can be stated that energy can be transferred totally from one system to another only if the configuration of the energy in one system is identical to the configuration in the other system in terms of the ratio of the component parts and the time variation between the component parts. The configuration has been given the name "impedance" and it can be simply stated that complete energy transfer is possible only if impedances are matched. Thus, an impedance match can be visualized as a boundry region between two systems through which energy is wholly transmitted, and an impedance mismatch as a boundary condition through which some energy is transmitted but some is reflected.

Thus, returning to FIGURE 4, it is highly desirable to have an impedance match between the transducer 5 and the medium in which the standing wave is to be established and, it is also important to have, as nearly as possible, a complete impedance mismatch between the reflecting surface at 7 and the impedance of the medium.

With respect to the medium itself, the impedance is a function of its density and compressibility, although it is more convenient to regard impedance as a function of the density and velocity of propagation through the medium, velocity of propagation itself being a function of compressibility and density.

Thus, to the extent that the impedance of the transducer and medium are matched, energy can be forced into the medium, and to the extent that the medium and reflector are mismatched, energy can be prevented from transmitting from the medium into the reflecting member.

Transducers

Broadly considered, a transducer is a device which changes energy from one form to another. A piezoelectric transducer employs the "piezoelectric effect" and has the ability to convert mechanical energy to electrical energy. The reverse effect, in which a transducer is caused to distort upon applying a potential across it, is called the "converse piezoelectric effect." There are a number of natural crystals which exhibit these effects, such as quartz, rochelle salts, and tourmaline.

A planar transducer, such as shown at 5 (FIGURE 4), may be made from X-cut quartz crystal which, upon application of an electrical potential, distorts in thickness and, when excited at its natural resonant frequency, readily establishes waves of ultrasonic frequency within the liquid in the sensor. The detector transducer 5a on the other hand, may be an AT-cut crystal which distorts flexurally upon application of an electrical potential to its opposite faces. Conversely, when flexed, this transducer will generate a charge on its opposite faces.

Although quartz or any other naturally piezoelectric crystal material may be readily used for making planar transducers, this is not convenient for making cylindrical transducers, such as required by the cylindrical sensors, to be described shortly. For such purposes, it is desirable to use a moldable ceramic material such as barium titanate. Transducers may be made from barium titanate by molding the material into the desired shape and firing it at 1300°–1400° C. After firing, it is polarized by a high electric field, after which suitable electrodes are secured to it, as by electroplating.

Cylindrical Sensors

Shown in FIGURES 8–11 are cylindrical sensors employing cylindrical transducers for driving purposes and planar transducers for detection purposes.

Figure 9:
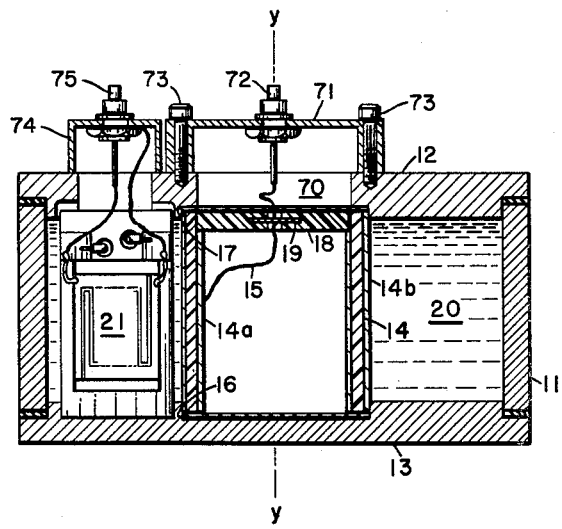
FIGURE 9 is a cross sectional view through the cylindrical sensor taken on plane 9—9 of FIGURE 8.

Directing attention first to FIGURE 9, it will be noted that the cylindrical sensor includes a cylindrical outer wall 11 bounded by circular top and bottom walls 12 and 13. Between the top and bottom walls is clamped a cylindrical transducer 14 having an interior electrode 14a with which electrical connection is established through conductor 15, the exterior electrode 14b of the transducer being grounded to the top and bottom walls by direct contact at 16 and 17. The interior and exterior electrodes may comprise a thin layer of silver electrodeposited on the barium titanate body of the transducer. A plastic end wall 18 may be provided at one end of the transducer to support an anchor member 19 through which the conductor 15 passes. Plastic end wall 18, concentric with opening 70 is protected by a cover plate 71 which is provided with a terminal 72 for conductor 15 and attached to the top wall 12 by bolts 73. A second cover plate 74 is also provided to support a terminal 75 for the leads of the transducer 21.

Transducer 14 and wall 11 are concentric.

Figure 8:
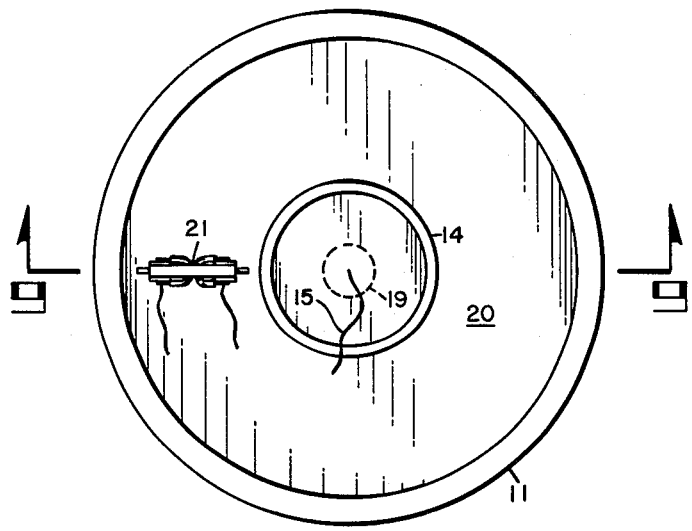
FIGURE 8 is a top plan view of a cylindrical sensor having a single driving transducer, the view showing the sensor as it appears with its top cover plate removed.

In the sensor shown in FIGURES 8 and 9, the transducer 14 acts as a driving transducer and sets up uniform radially extending standing acoustic waves within the cavity 20 of the sensor, the cavity being filled with a liquid such as glycerine. A detector transducer 21 is mounted radially within the cavity for detecting Coriolis forces oriented substantially at 90° to the radial standing waves when the sensor is rotated about axis y—y shown in FIGURE 9. The standing waves define a pattern of concentric pressure nodes and antinodes concentric with each other and the transducer 14; from the waves when rotated, emanate Coriolis forces acting circumferentially within the medium 20, substantially normal to the detector transducer. Thus, transducer 14 causes particles in the cavity 20 to move radially, and Coriolis forces due to rotation of the sensor cause the particles to move circumferentially. For these reasons, transducer 21 responds to the circumferentially acting Coriolis forces. The details of the detector transducer will be discussed shortly.

The cylindrical outer wall 11, which may be made from cast iron, serves as a reflector reflecting the waves set up in the medium by the driving transducer 14 and in this way standing waves are established having an energy per cycle considerably in excess of the energy per cycle delivered by the transducer 14 to the medium.

Figure 10:
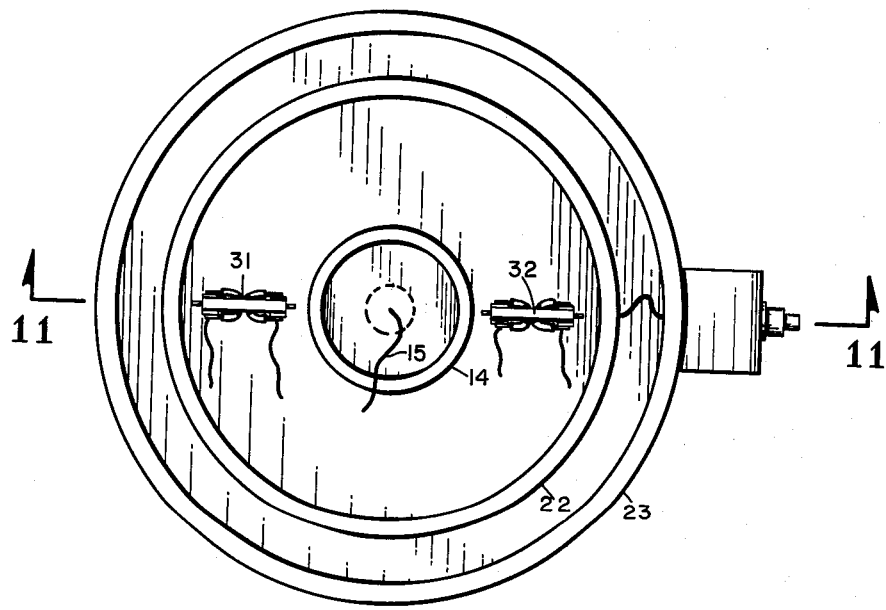
FIGURE 10 is a top plan view of a cylindrical sensor having a pair of driving transducers, the view showing the sensor as it appears with its top cover plate removed.
Figure 11:
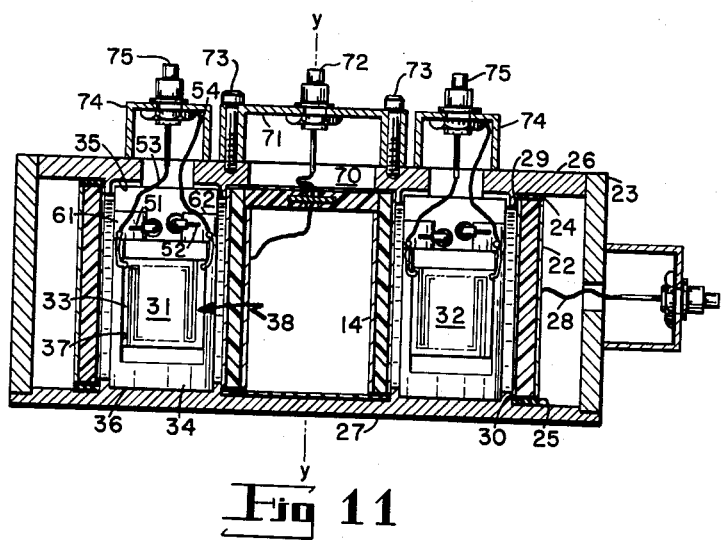
FIGURE 11 is a cross sectional view of the sensor taken on plane 11—11 of FIGURE 10.

The same principles may be applied in the construction of a sensor having a pair of driving transducers as shown in FIGURES 10 and 11. In this construction the cylindrical driving transducer 14 is identical with that described with reference to FIGURES 8 and 9 but an additional concentric cylindrical driving transducer 22 is provided adjacent the cylindrical outer wall 23. A fluid medium, such as glycerine, fills the cavity between the driving transducers. The cylindrical transducer 22 also has interior and exterior electrodes and is insulated by gaskets 24 and 25 from the top and bottom walls 26 and 27. Electrical connection is established by conductor 28 which is soldered to the exterior electrode of the transducer, the inner electrode being grounded to the top and bottom walls by direct electrical contact at 29 and 30. Cover plates 71 and 74 and terminals 72 and 75 for the driving and detecting transducers are provided in the same manner as described in connection with FIGURE 8.

The inner and outer driving transducers 14 and 22 may be simultaneously energized from a conventional electrical source (not shown) and cooperate in establishing radial standing waves within the cavity of the sensor. Excitation of the transducers at a frequency of 800–1000 kc. is deemed satisfactory, although the frequency is not critical and may be varied to meet the requirements of particular sensors. Rotation of the sensor about axis y—y generates Coriolis forces which flexurally distort the detector transducers 31 and 32 which are positioned radially within the cavity. The output of the detectors provides a measure of rotation.

For most effective operation, the cavities of the sensors must be completely filled with fluid. Internal circulation of the fluid is undesirable since particle motion should only be responsive to the energy of the standing waves or the Coriolis forces emanating from them. To discourage internal circulation caused by viscous forces upon rotation of the sensor, a plurality of detectors may be provided such as shown at 31 and 32. Thus, the detectors not only detect Coriolis forces but act as baffles for minimizing fluid circulation.

It is feasible to use more than a single detector since all of the detectors are simultaneously subjected to the same circumferentially acting Coriolis forces.

Detector Transducer

The construction of all of the detector transducers is similar and for this reason may be conveniently described with respect to the detector 31 shown in FIGURE 11.

It will be noted that the body of the transducer itself comprises a slab of quartz 33 which is mounted within a plastic frame 34. The frame engages grooves 35 and 36 formed in the top and bottom walls of the sensor. In this way accurate radial positioning of the detector is secured.

The mounting of detector transducers requires special care. It has been found advisable to use a soft substance which contacts only the edges of the crystal to minimize damping by mechanical restraint. This is illustrated, for instance, by the epoxy resin 37, which is used to cement the quartz slab 33 within its supporting frame 34.

To the opposite faces of the crystal are intimately secured, as by electroplating, gold electrodes, generally designated 38. The individual electrodes on each face of the transducer can best be understood by reference to FIGURE 6 which is a diagrammatic showing of both faces of the detector as developed around a line co-extensive with the top edge of the frame 34.

On one face of the transducer, a pair of electrodes 41 and 42 are secured, while to the opposite face of the transducer a pair of electrodes 43 and 44 are attached, each individual electrode comprising an intricate network of elements. Thus, concentrating attention on electrode 41, it will be noted that it includes a horizontal portion 45 with a number of interconnected strips 46 which extend vertically from member 45. The electrode 42 is somewhat similar, including a horizontal member 47 and a series of interconnected vertical strips 48. The strips 46 and 48 are intercalated and are equally spaced from one another.

Figure 6:
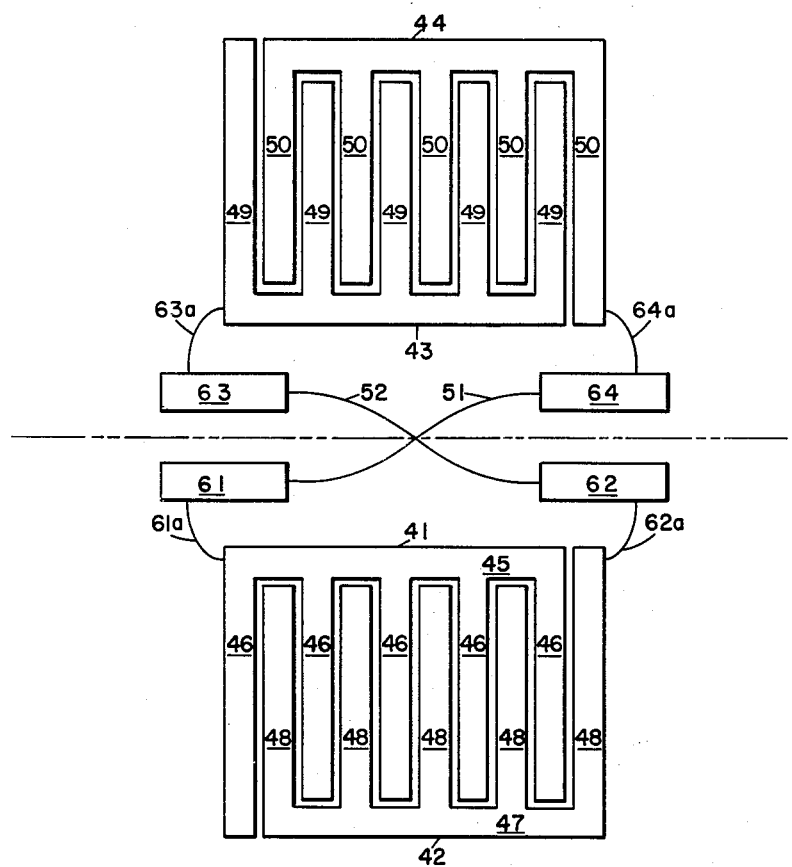
FIGURE 6 is a developed view of a detector transducer.

The electrodes on one side of the transducer are mirror images of those on the other side and are positioned directly opposite one another as indicated by FIGURE 6. Associated with electrode 43 are strips 49, while strips 50 are associated with electrode 44.

Figure 7:
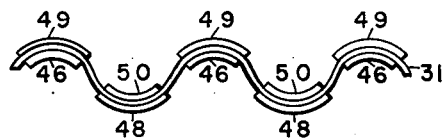
FIGURE 7 is a diagrammatic illustration of the detector transducer when deflected flexurally.

The center to center distance between the adjacent strips of each electrode is chosen equal to one-half the wave length of the standing wave set up in the sensor by the transducers 14 and 22. This will be more fully understood by reference to FIGURE 7 which has been enlarged and exaggerated in the interest of clarity. Here a portion of the transducer 31 is shown distorted, as under the influence of the Coriolis forces. A pair of strips of the opposed electrodes are shown positioned at each crest and each valley of the flexed crystal. Since the polarity of the charge generated on the face of the transducer is a function of the nature of the flexure, i.e., whether it is concave or convex, all of the concave strips of the transducer are electrically interconnected, as are all of the convex strips. This is accomplished by interconnections such as shown in FIGURE 6.

Returning to that figure, it will be noted that four terminals 61–64 are shown, each terminal being connected by an associated conductor 61a–64a to an electrode 41–44, respectively. Since the strips 46 and 50 of electrodes 41 and 44 are all positioned adjacent concave portions of the transducer, they are interconnected by conductor 51. Since the vertical strips 48 and 49 of electrodes 42 and 43 are immediately adjacent the convex portions of the transducer, they are interconnected by conductor 52. Thus, all electrode strips which are subjected to a like polarity by virtue of a common type transducer distortion are electrically interconnected, and each interconnected set of electrodes is connected to an electrical circuit (not shown) by conductors 53 and 54. In the interest of simplicity, only a few strips have been shown in FIGURES 6 and 7. In practice, the number of strips is determined by the length of the detector and the wave length of the acoustic wave in the medium. A total of about 50 strips may be provided on each face of each transducer.

*Associated Electronic Circuits*

As yet nothing has been said about the energy source for driving the transducers and detecting the degree of flexure of the detector transducer. The circuits themselves are conventional and, for this reason, may be described rather generally.

The driving transducers may be energized by a single power amplifier. Operating frequency of the amplifier, and hence the transducers, is established by an oscillator. Other arrangements are possible. For instance, where two driving transducers are used, each may be driven by a separate power amplifier but they may be driven in parallel from a single amplifier.

The signal from the detector transducers may be fed in parallel to an amplifier which in turn delivers its amplified output signal to an oscilloscope. The wave form on the oscilloscope is indicative of the rate of rotation of the sensor since the amplitude of the wave form provides a measure of the size of the Coriolis forces deflecting the detector transducer.

For detecting direction of rotation, as well as rate of rotation, a phase sensitive demodulator may be connected to both the driving transducers and the detector transducer. The output from the demodulator may be supplied to a D.C. voltmeter which will indicate negative D.C. voltage for one direction of rotation and a positive D.C. voltage for the other direction of rotation. The amplitude of the voltage shown by the D.C. voltmeter will be proportional to the rate of rotation over a considerable range.

Generally speaking, the output signal from the phase sensitive demodulator may be used in all the ways that a similar signal developed from a conventional gyroscope and its associated circuitry may be used, as for example, an error signal in a closed loop servo system forming part of a stable platform designed to provide a fixed reference with respect to inertial space despite all manner of movement.

*Conclusion*

It is noteworthy that the present invention does not employ any moving parts in the conventional sense. For this reason, no friction is present and therefore its rate of deterioration is much lower. No precessional problems are created by mechanical bearings as in conventional gyroscopic mechanisms. For this reason, the sensors are particularly well adapted for guidance systems of long range vehicles where processional errors can introduce signal errors in guidance over an extended period. A further advantage over conventional gyroscopes is the rapidity with which it can be brought from an idle condition to a properly functioning steady state operating condition. This rapid starting is particularly useful for missile application where instant readiness is obviously desirable.

Having described my invention, I claim:

1. In combination in a sensor for detecting rotation, a cylindrical housing capable of reflecting acoustic energy, a liquid medium within said housing, a cylindrical transducer in said medium concentric with and fixed relatve to said housing for establishing standing waves within said medium having pressure nodes and antinodes concentric with said cylindrical transducer, and means including a detector within said medium for detecting Coriolis forces associated with said waves as a result of rotation of said housing, said detector being fixed relative to said housing.

2. Apparatus as defined in claim 1 in which said detector comprises a flexural type piezoelectric transducer oriented radially in said medium within said housing.

3. In a rotation sensor, a cylindrical housing, a pair of concentric cylindrical piezoelectric compressional type transducers within said housing, a liquid medium in said housing between said transducers, a flexural type piezoelectric detector transducer within said medium positioned radially of said cylindrical transducers, said cylindrical transducers establishing standing waves within said medium having pressure nodes and antinodes concentric with said cylindrical transducers which, upon rotation of said housing, set up circumferential force components flexurally deflecting said detector transducer.

4. In combination in a rotation sensor, a housing, spaced concentric cylindrical inner and outer piezoelectric transducers within said housing, a fluid medium within said housing between said inner and outer transducers, said cylindrical transducers establishing a standing wave in said fluid, and means including a detector transducer in said medium between said inner and outer transducers for detecting Coriolis forces in said medium as a result of rotation of said housing, said detector being fixed relative to said housing.

5. In a sensor, a pair of spaced concentric cylindrical piezoelectric transducers, a fluid in the space between said transducers, said cylindrical transducers establishing a standing wave in said fluid, and a plurality of planar detector transducers positioned radially at intervals within the space between said first mentioned transducers, said planar transducers being immersed in said fluid and responsive to circumferential forces in said fluid.

6. In a rotation sensor, a medium, means including a piezoelectric transducer for establishing standing acoustic waves in said medium extending circumferentially about said transducer, means including a piezoelectric detector transducer in communication with said medium and positioned radially of said first named transducer for detecting Coriolis forces associated with said waves as a result of rotation of said medium, rotation of said medium about an axis through the common center of the standing waves creating Coriolis forces that are detected by said detector transducer.

7. In combination in a rotation sensor, a confined medium, means for establishing standing waves within said medium having pressure nodes and antinodes concentric with said means about a central point in said medium, and detector means positioned within said medium radially of the central point for detecting Coriolis forces emanating from the standing waves upon rotation of said medium.

8. In combination in a sensor, a housing having a cylindrical outer wall, a cylindrical piezoelectric transducer within said housing spaced from and concentric with said outer wall, a fluid medium within the housing between said transducer and said outer wall, said outer wall and said cylindrical transducer establishing a standing wave in said medium, and a planar piezoelectric transducer positioned radially between said transducer and outer wall, said last-named detector transducer being immersed in said medium and responsive to circumferential forces in said medium.

9. In a rotation sensor, a housing capable of reflecting acoustic energy, a cylindrical piezoelectric transducer within said housing, a fluid medium within said housing in intimate association with said transducer, said transducer establishing standing radial waves in said medium determining a pattern of pressure nodes and antinodes concentrically about said transducer, and a planar detector transducer within said medium positioned radially across the pattern of nodes and antinodes responding to Coriolis forces emanating from the standing waves upon rotation of said housing and medium.

10. In combination in a rotation sensor, a confined liquid, substantially cylindrical means for establishing standing acoustic waves in said liquid radiating circumferentially outwardly from said means, a reflective surface surrounding and spaced from said means, and a piezoelectric flexural-type detector having points of natural sinusoidal flexural deflection in said liquid extending radially from said means, said detector being designed so that the distance between corresponding points of its natural sinusoidal flexural deflection is equal to one-half the wave length of the standing waves set up in said liquid by said means, sinusoidal deflection of said detector in response to Coriolis forces emanating from the standing waves upon rotation of said liquid generating an output signal proportional to the rate of rotation.

References Cited in the file of this patent

UNITED STATES PATENTS

| | | |
|---|---|---|
| 2,415,832 | Mason | Feb. 18, 1947 |
| 2,490,452 | Mason | Dec. 6, 1949 |
| 2,565,159 | Williams | Apr. 21, 1951 |
| 2,683,247 | Wiley | July 6, 1954 |
| 2,753,173 | Barnaby | July 3, 1956 |
| 2,999,389 | Granquist | Sept. 12, 1961 |
| 3,009,104 | Brown | Nov. 14, 1961 |